May 19, 1931. J. N. NELSON 1,805,529
OPHTHALMIC MOUNTING
Filed Sept. 30, 1927
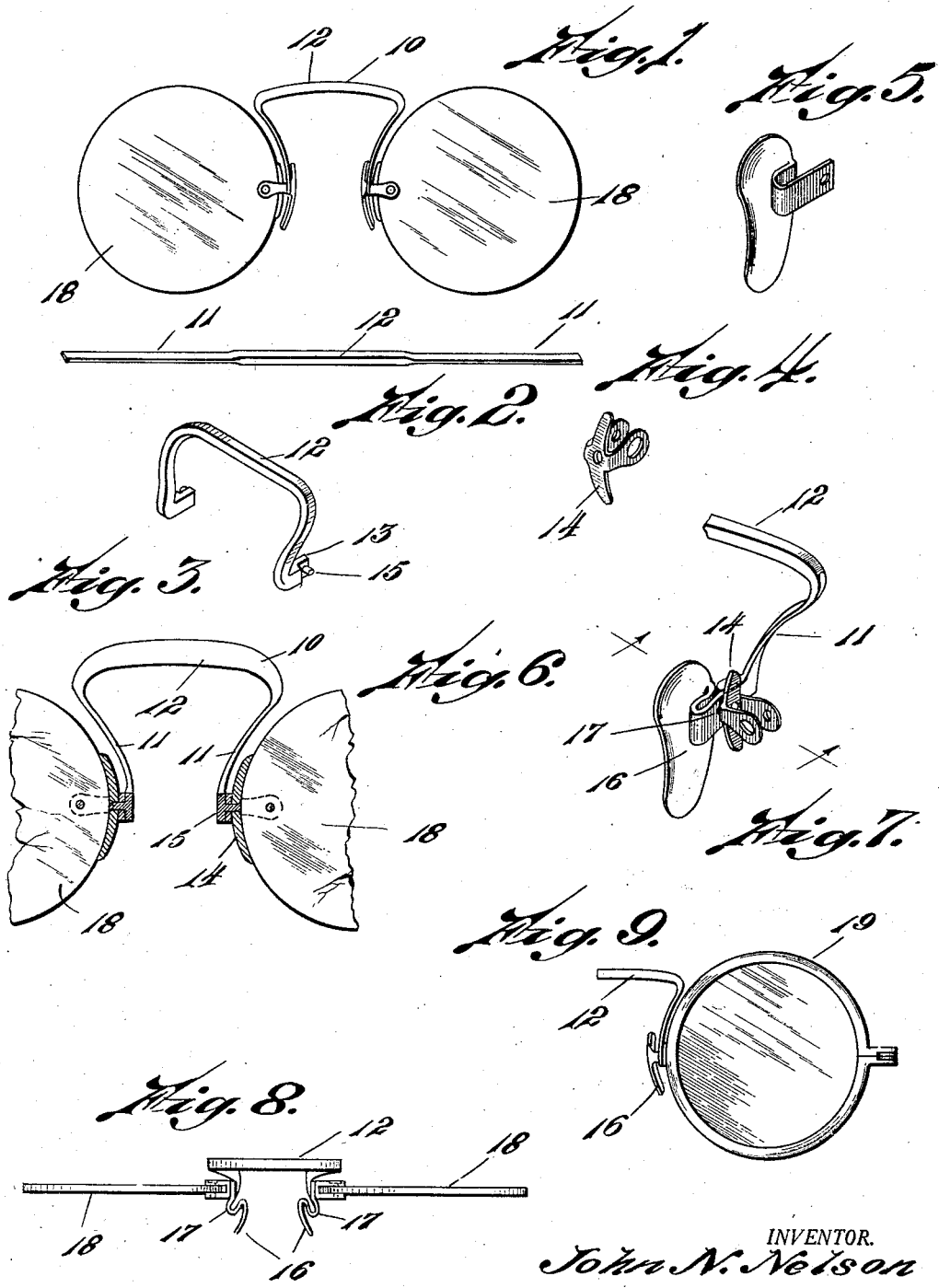
INVENTOR.
John N. Nelson
BY Barlow & Barlow
ATTORNEYS.

Patented May 19, 1931

1,805,529

UNITED STATES PATENT OFFICE

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC MOUNTING

Application filed September 30, 1927. Serial No. 223,027.

This invention relates to an improved ophthalmic mounting and has for its object to provide in such a mounting a nosepiece having a relatively rigid cross-bar portion with resilient side arms to which the lenses are connected.

A further object of the invention is the provision of a rearwardly-extending member on said arm for connecting the nose-guards thereto.

The invention further consists in forming these rearwardly-extending members, by which the nose guards are connected to the side arms, as folded back upon themselves and bendable to permit of adjustment to fit the different noses to which the mounting is applied.

With these and other objects in view, the invention consists of certain novel features of construction, as will be more fully described, and particularly pointed out in the appended claims.

In the accompanying drawings:

Fig. 1 is a front view of one form of my improved ophthalmic mounting showing my specially constructed nosepiece with a relatively rigid cross-bar and with resilient side arms attached to the lenses.

Fig. 2 shows a length of the nosepiece wire reduced at its end portions to make them thin and resilient before being bent into U-shape.

Fig. 3 shows a length of this wire bent into U-shape before its side arms are reduced.

Fig. 4 is a perspective view of one of the lens saddles which is arranged to be connected to the side arms of the nosepiece.

Fig. 5 is a perspective view of one of the nose-guard members having an integral bendable member formed thereon.

Fig. 6 shows the nosepiece as bent into U-shape with the side arm portions reduced or formed thin and resilient and a lens saddle secured thereto.

Fig. 7 is a perspective view showing the nose-guard and lens saddle as connected to one of the side arms of the nosepiece.

Fig. 8 is a top edge view of the mounting showing the nosepiece as set forward of the plane of the lenses connected thereto.

Fig. 9 is a view showing an eye wire as connected to one of the side arms for supporting a lens therein.

It is found in the practical construction and arrangement of ophthalmic mountings of advantage in some instances to omit the usual pivoted spring-pressed nose-clamps for holding the eyeglasses on the nose of the wearer and to provide instead thereof a nosepiece having a relatively rigid cross-bar or bridge portion and resilient side arms for exerting the necessary gripping pressure on the nose of the wearer to retain the mounting in position thereon as such a mounting is much neater in appearance and is less expensive to manufacture. In some instances, it is found of advantage in such a construction to provide means attached to the resilient side arms for supporting the lenses either with or without an eye wire and also to support the nose-guard or gripping members on bendable, rearwardly-extending portions, whereby the bridge or cross-bar of the nose portion may be set forwardly when necessary to clear the forehead of the wearer and at the same time permit these nose guards to be adjusted to fit the different individual wearers; and the following is a detailed description of the present embodiment of my invention and showing one means by which these advantageous results may be accomplished:

With reference to the drawings, 10 designates the nosepiece member which may be formed from a length of wire with its end portions reduced as at 11 causing them to be resilient or springy leaving the cross-bar or bridge portion 12 relatively rigid to hold or maintain the finished shape into which it is formed. In some instances, the length of wire may be reduced before it is bent into U-shape or yoke form and while in other instances it may be, as illustrated in Fig. 3, have its end portions bent into this U-shape and subsequently have its side arms swaged and formed very thin to render them springy or resilient to exert the necessary holding pressure on the nose of the wearer.

These side arm members preferably have a rearwardly turned extremity 13 which is arranged to receive the lens-supporting saddle member 14 which may be connected thereto by a rivet 15 or other suitable means.

In some instances, it is found of advantage to provide nose-guard members 16 and offset them rearwardly from the ends of the resilient side arms by means of folded bendable extending members 17 one end of each of which is formed integral with its nose-guard, the other end being riveted or otherwise connected to the end of its arm 11.

By this construction, it will be seen that the cross-bar or bridge member may be set forwardly a considerable distance when found necessary to clear the forehead of the wearer also by the use of these bendable members the nose-guards may be adjusted toward or from each other to regulate their grip and be positioned to fit the nose of the wearer. In some instances, the lenses 18 may be supported on the saddles 14 and ears while in other instances as illustrated in Fig. 9, eye-wires 19 may be employed.

My improved nosepiece may be arranged as desired and by forming the bridge or cross bar rigid and the side arms flexible a more satisfactory and practical nosepiece is provided than if the whole nosepiece were formed of resilient material.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a yoke-shaped nosepiece including a relatively rigid cross-bar portion, thin resilient elongated side arms integral therewith, said arms each having a rearwardly extending end portion, and lens engaging members and nose guard members secured to said rearwardly extending end portions.

2. In an ophthalmic mounting, a yoke-shaped nosepiece having a relatively rigid cross-bar portion with thin resilient side arms, said arms each having a portion extending rearwardly from its end, said rearwardly-extending portion having a fastening projection, and lens engaging members and nose-guard members secured by said fastening projection to said rearwardly-extending arm portions.

3. In an ophthalmic mounting, a yoke-shaped nosepiece having a relatively rigid cross-bar portion with elongated thin resilient side arms, said arms each having a rearwardly-extending end portion, a nose-guard member, and a lens-engaging member carried by said rearwardly-extending arm ends, said ends each having a stud member and a shoulder portion cooperating to locate and rigidly secure said nose guard and lens-engaging members in position on said arms.

4. In an ophthalmic mounting, in combination, a bridge comprising a rigid metal cross bar and side arms formed integral with said rigid cross bar, said side arms being materially reduced in thickness to impart resilience thereto, the ends of said side arms being turned perpendicular to the plane of the bridge, lens engaging members, nose guard members, and means securing said lens engaging members and said nose guard members to the ends of said resilient side arms.

In testimony whereof I affix my signature.

JOHN N. NELSON.